United States Patent
Berkmann

(10) Patent No.: US 6,742,798 B2
(45) Date of Patent: Jun. 1, 2004

(54) BIPOD SUPPORT FOR A TWO WHEELED VEHICLE

(75) Inventor: Franz Berkmann, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 141 days.

(21) Appl. No.: 10/098,533

(22) Filed: Mar. 18, 2002

(65) Prior Publication Data
US 2002/0130487 A1 Sep. 19, 2002

(30) Foreign Application Priority Data
Mar. 16, 2001 (DE) .......................... 101 12 655

(51) Int. Cl.⁷ .................................................. B62H 1/00
(52) U.S. Cl. ...................................................... 280/300
(58) Field of Search ................................ 280/293, 298, 280/299, 300, 302; 248/351, 121

(56) References Cited

U.S. PATENT DOCUMENTS

| | | | | | |
|---|---|---|---|---|---|
| 1,622,383 A | * | 3/1927 | Jeske | ........................... | 280/303 |
| 3,658,360 A | * | 4/1972 | Wood | ........................... | 280/302 |
| 3,998,470 A | * | 12/1976 | Houston | ...................... | 280/301 |
| 4,119,327 A | * | 10/1978 | Emerson | ...................... | 280/302 |
| 4,432,562 A | * | 2/1984 | Cline | ............................. | 280/300 |
| 4,445,705 A | * | 5/1984 | Hayashi et al. | ............. | 280/302 |
| 4,541,650 A | * | 9/1985 | Cline | ............................. | 280/299 |
| 4,582,336 A | * | 4/1986 | Onoda | .......................... | 280/293 |
| 5,388,848 A | * | 2/1995 | Silva et al. | .................. | 280/300 |
| 5,623,855 A | * | 4/1997 | Miles | ............................. | 74/564 |
| 6,217,051 B1 | * | 4/2001 | Nakagawa et al. | ......... | 280/303 |
| 6,340,166 B1 | * | 1/2002 | Rethman et al. | ............ | 280/293 |

FOREIGN PATENT DOCUMENTS

| | | |
|---|---|---|
| DE | 535 592 | 10/1931 |
| DE | 572 416 | 3/1933 |
| DE | 696 379 | 9/1940 |
| DE | 877 994 | 5/1953 |

* cited by examiner

Primary Examiner—Lesley D. Morris
Assistant Examiner—Paul Royal, Jr.
(74) Attorney, Agent, or Firm—Crowell Moring LLP

(57) ABSTRACT

A bipod support for a two-wheeler is provided which swivels about an axis extending in a transverse direction of the vehicle. For its operation, a foot lever can be swiveled about this swiveling axis from a first end position for the driving operation into a second end position for parking the two-wheeler. In this case, during the swiveling for placing the two-wheeler in an intermediate position, the bipod support touches the ground with both its feet and, starting from this intermediate position, the two-wheeler and the axis of the bipod support are swiveled about another swiveling axis along the connection line of the two ground contact points of the feet, until the bipod support has reached its second end position. One of the two feet of the bipod support, viewed in the longitudinal direction of the two-wheeler, projects farther toward the front than the other to thereby cause a temporary tilting of the vehicle toward the driver during parking operations.

10 Claims, 4 Drawing Sheets

BIPOD SUPPORT FOR A TWO WHEELED VEHICLE

BACKGROUND AND SUMMARY OF THE INVENTION

This application claims the priority of German Priority application 101 12 655.7 filed Mar. 16, 2001, the disclosure of which is expressly incorporated by reference herein.

The invention relates to a bipod support for a two-wheeled vehicle. Preferred embodiments of the invention relate to a bipod support for a two-wheeler which is mounted on the two-wheeler swivellably about an axis extending in the transverse direction of the vehicle. For its operation by a foot lever can swivell the bipod support about this swiveling axis from a first end position for the driving operation into a second end position for parking the two-wheeler.

Two-wheeler supports are known which are called bipod supports or tilting stands. A tilting stand is normally constructed as a two-armed bearing block which, swivellably about a transverse vehicle axis, is mounted on the two-wheeler and supports the latter in its upright position in that a wheel is lifted off the ground.

For a better operability, some tilting stands are provided with foot levers which make it easier for the operator of the two-wheeler to reach the tilting stand and, as a result of the lever effect, the formation of a favorable point of application of force, etc., reduce the force to be applied by the operator to righten up the two-wheeler. German Patent Document 535 592 describes a tilting stand for motorcycles with a foot lever which can be reached from the motorcycle operator's seat, which foot lever is mounted such that, when the wheel is raised, it rests with its free end on the road.

The foot lever aids the righting-up of the two-wheeler in that it can be loaded at its free end by the entire body weight, which generates a torque about the contact point of the tilting stand on the ground, which torque lifts up the two-wheeler, possibly aided by an upward-directed pulling force exercised by the operator at the two-wheeler.

When the operator of the two-wheeler loads the tilting stand by means of his body weight, he can only apply limited additional force for holding the two-wheeler in the vertical direction to prevent it from tipping over. Therefore, when the torque is applied to the foot lever by the driver, he has to make absolutely certain that the two-wheeler tilts as little as possible. When the ground is uneven or the road is inclined, this is not always possible, particularly if the vehicle is loaded, in which case a tilt of the two-wheeler directed toward the operator has a favorable effect for a stabilization during the righting-up on the tilting stand, while a tilt of the two-wheeler directed away from the operator can easily cause a tipping-over. Particularly, low-weight persons, will no longer be able to bring the two-wheeler back into the vertical position starting even at a relatively slight tilt in this direction. This applies not only to setting up the two-wheeler on the tilting stand but also to the so-called removal from the tilting stand for readying the two-wheeler for its operation.

It is therefore an object of the invention to provide a two-wheeler which makes it easier for the operator to prevent a tipping-over of the two-wheeler when the two wheeler is rightened up on the tilting stand and removed from the tilting stand under unfavorable conditions.

According to the preferred embodiments of invention this object is achieved by providing a tilting stand for a two-wheeler which is mounted on the two-wheeler for swiveling about a first axis extending in a transverse direction of the vehicle. For its operation the tilting stand can be swiveled about this first axis by means of a foot lever from a first end position for the driving operation into a second end position for parking the two-wheeler. During the swiveling for placing the two-wheeler in an intermediate position, the tilting stand touches the ground with both of its feet and, in this intermediate position, the two-wheeler and the axis of the tilting stand are swiveled about a second swiveling axis which connects the two ground contact points of the feet, until the tilting stand has reached its second end position. One of the two feet of the tilting stand, viewed in the longitudinal direction of the two-wheeler, projects farther toward the front than the other.

This arrangement has the advantage that, for the righting-up of the two-wheeler and for its removal from the tilting stand, the latter is swiveled to a side by a defined angular range, a slight tilt of the two-wheeler directed toward the operator of the two wheeler creating a force application position which is favorable for the operator, which force application position contributes to the simple operability of the tilting stand when stabilizing the two-wheeler during the righting-up on the tilting stand and the removal from the tilting stand.

In an advantageous embodiment of the invention, the right foot projects farther toward the front. This has the advantage that during the righting-up on the tilting stand and during the removal from the tilting stand, the two-wheeler is swiveled toward the left to the side by a defined angular range. After the driver, as customary, has mounted the motorcycle and dismounted from the motorcycle from and onto the left side and also operates the tilting stand from there, a slight tilt of the two-wheeler toward the left is favorable for a force application position of the operator of the two-wheeler, as a result of which a tipping-over of the two-wheeler can easily be avoided.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
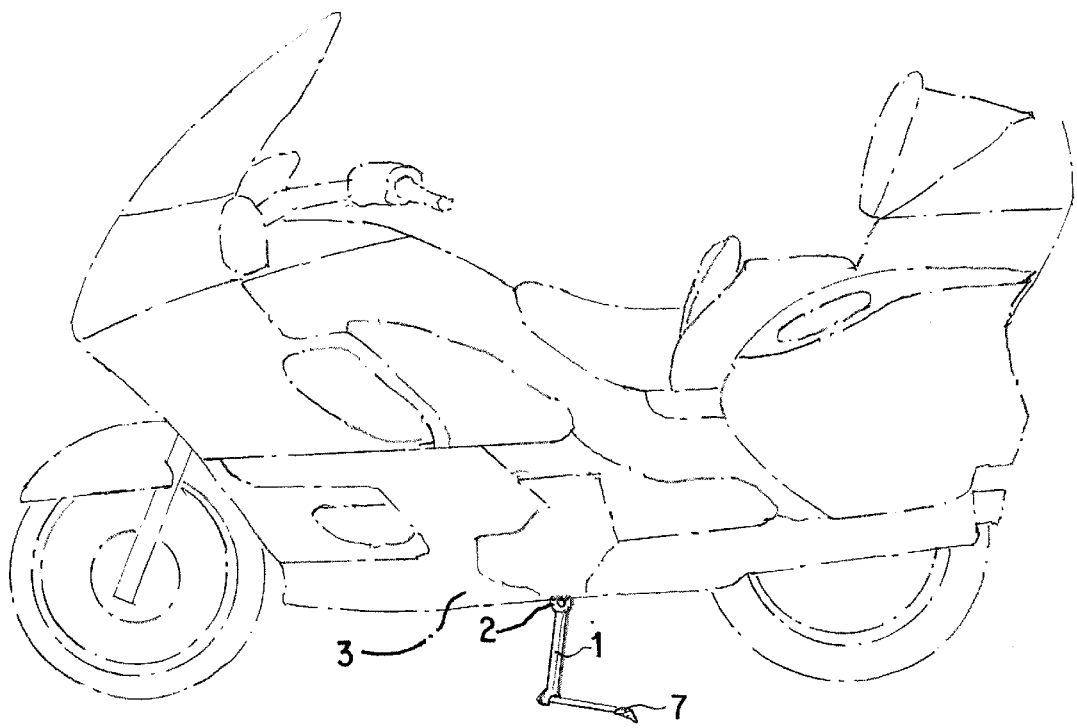
FIG. 1 is a schematic side view of a two wheel motorcycle, with a tilting stand constructed according to the prior art.

FIG. 1 is a schematic right side view of a two wheeler (motorcycle) fitted with a tilting stand or bipod support. Tilting stand 1 is swivellably supported at motorcycle frame 3 for pivotal movement between a retracted condition for normal driving as depicted in FIG. 1 and a motorcycle support condition with feet of the tilting stand engaging the ground 5 and the stand lifting one of the wheels off the ground. This general arrangement of a tilting stand on a motorcycle is known in the prior art.

Figure 2:
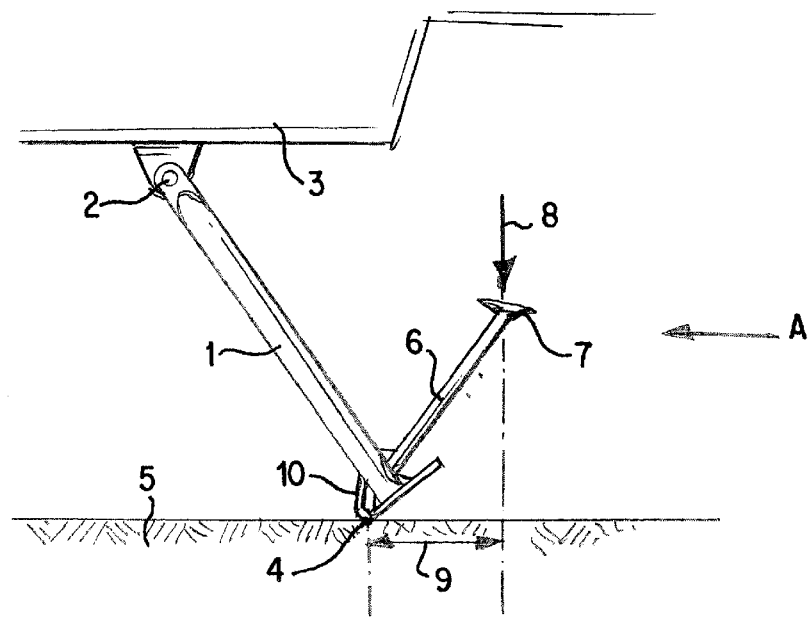
FIG. 2 is a schematic lateral view of a tilting stand for a two-wheeler according to the prior art.
Figure 3:
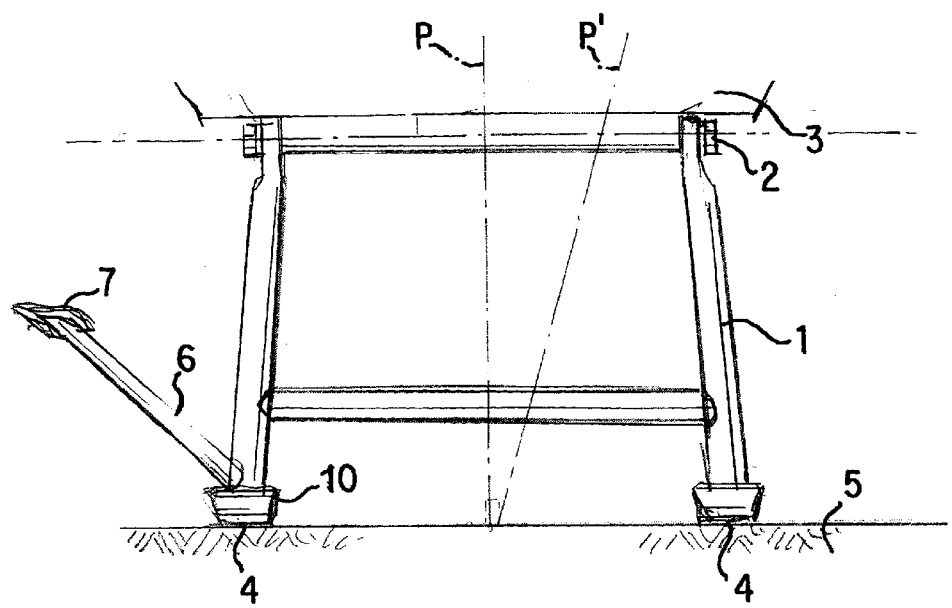
FIG. 3 is a schematic rear view of the tilting stand of FIG. 2.
Figure 4:
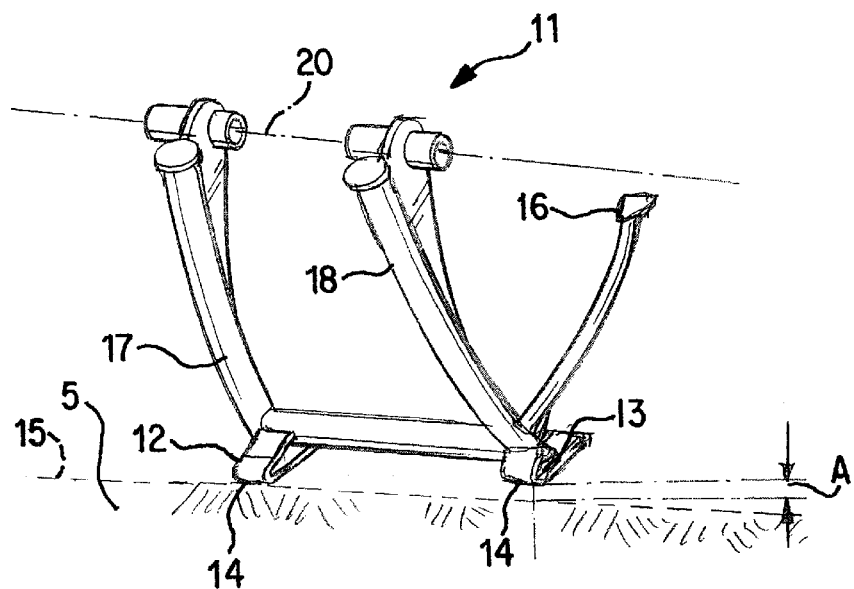
FIG. 4 is perspective view of a tilting stand for a two-wheeler constructed according to a preferred embodiment of the invention.
Figure 5:
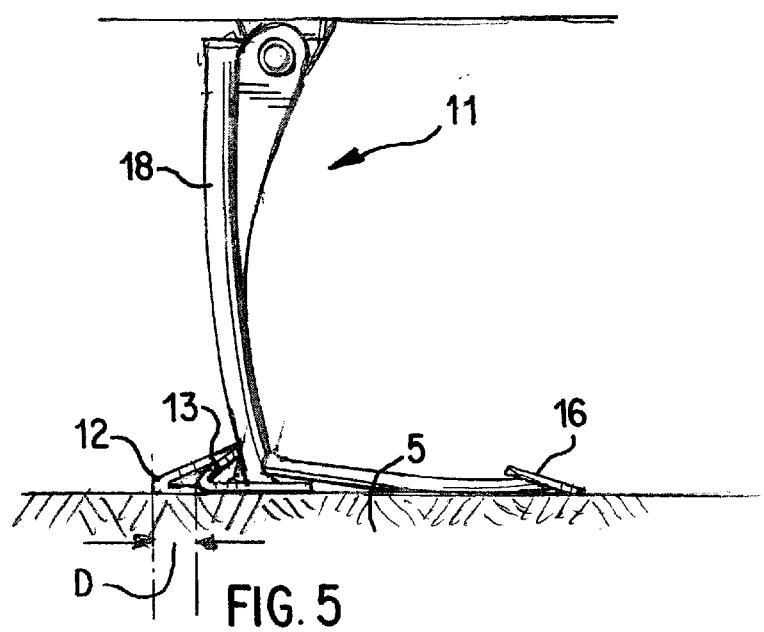
FIG. 5 is a schematic lateral view of the tilting stand of FIG. 4.
Figure 6:
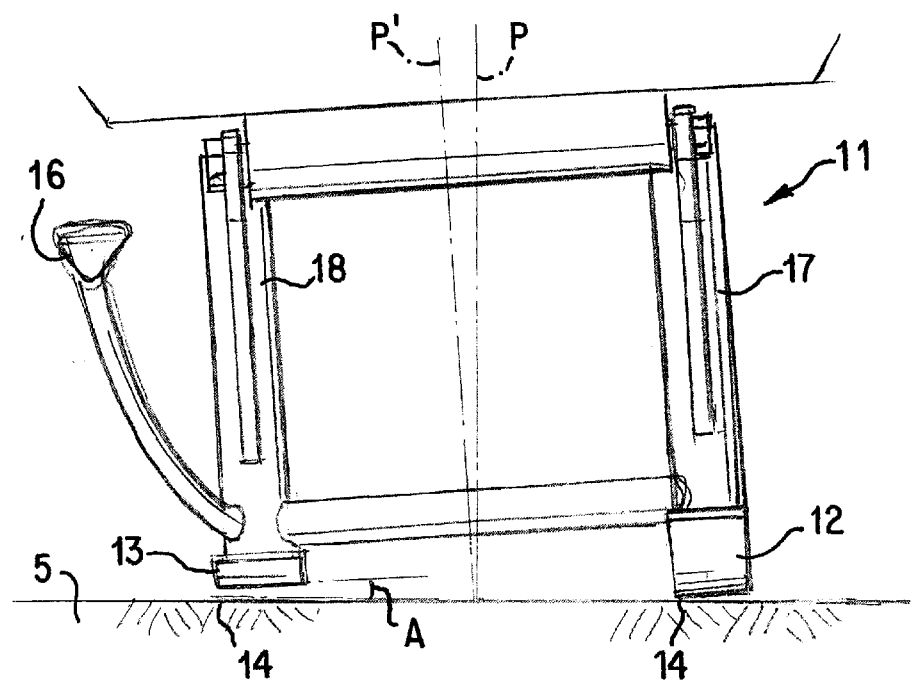
FIG. 6 is a schematic rear view of the tilting stand of FIGS. 4 and 5 shown in an intermediate position.
Figure 6A:
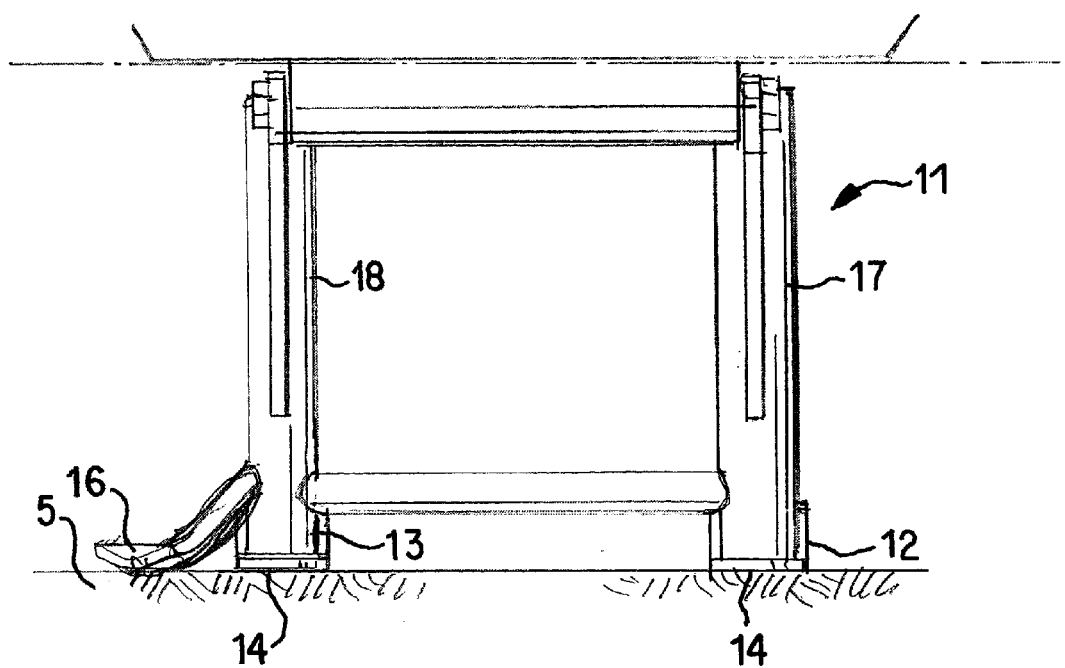
FIG. 6a is a schematic rear view of the tilting stand of FIGS. 4 and 5 shown in an end parked position.

FIGS. 2 and 3 schematically depict structure and operation of a tilting stand constructed according to the prior art.

Referring to FIG. 2, a tilting stand 1 according to the prior art is disposed on a schematically illustrated two-wheeler frame 3 for pivoting movement about a transverse vehicle axis 2. The tilting stand 1 can be swiveled back and forth between two end positions, specifically an end position for the driving operation in the retracted condition and an end position for placing the two-wheeler in an extended parked condition. In FIG. 2, the tilting stand 1 is illustrated in an intermediate position between the two end positions, the position in which the tilting stand 1 touches the ground 5 by its two feet 10 at righting-up points 4 and, as a result of a further application of force, the two-wheeler would be lifted onto the tilting stand 1. The illustrated position of the tilting stand 1 shows precisely the moment at which a change of the center of rotation takes place, from the rotation about the transverse vehicle axis 2 to the rotation about an axis through the righting-up points 4.

For its operation, the tilting stand 1 has a foot lever 6 which is fixedly connected with it and whose free end 7 can be loaded by the body weight of the two-wheeler operator by means of his foot for rightening up the two-wheeler. If the tilting stand 1 is in the retracted condition, the operator of the two wheeler will, for this purpose, place his foot on the free end 7 of the foot lever 6 and thereby turn the tilting stand 1 about the transverse axis 2 of the vehicle into the illustrated position in FIG. 2 in which the tilting stand 1 touches the ground 5 by means of both feet 10 at the righting-up points 4. As a result of a further loading of foot lever 6, for example, by the entire body weight of the operator of the two-wheeler, symbolically illustrated by the force arrow 8, the tilting stand 1 will now rotate about another second swiveling axis—the connection line of the rightening-up points 4, a torque being generated about this second swiveling axis by means of the body weight, which torque acts by means of a lever arm which is illustrated by the double arrow 9. This torque swivels the tilting stand 1 about the additional swiveling axis (along points 4—4) while lifting the two-wheeler frame 3 clockwise until the free end 7 of the foot lever 6 also touches the ground 5 or until a stop face at the two-wheeler not shown here comes to rest on the tilting stand 1. During this second part of the rightening-up operation, under certain circumstances, as a result of a supporting rightening-up force in the upward direction applied by the operator to the two-wheeler, the two-wheeler weight may be relieved and, thereby the force of the weight of the operator onto the free end 7 can be increased, which in turn increases the torque.

FIG. 3 is a view in the direction of arrow A of FIG. 2 and schematically depicts the pair of tilting stand legs and feet 10, the left leg including the foot lever 6.

When placing the two-wheeler on or off this tilting stand 1 according to the prior art as shown in FIGS. 2 and 3, in the most favorable case, the two-wheeler will move in a plane which is perpendicular to the rightening-up surface, which is the ground 5 (Plane P schematically depicted in FIG. 3). When the ground is uneven or the road slopes, this is not always possible, in which case a tilt of the two-wheeler directed away from the operator may easily result in a tipping-over. Plane P' schematically depicted in FIG. 3 indicates such a tilting of the two wheeler. Particularly, low-weight persons, will no longer be able to bring the two-wheeler back into the vertical position starting even at a relatively slight tilt in this direction.

This undesired tilting and tipping over is prevented by a tilting stand 11 according to the invention as illustrated in FIGS. 4–6a. The tilting stand 11 corresponds essentially to stand 1 of FIGS. 2 and 3, with the difference that the right foot 12 of the tilting stand 11, viewed in the longitudinal direction of the two-wheeler, projects farther toward the front (distance D in FIG. 5) than the left foot 13. This asymmetry of the feet 12, 13 of the tilting stand 11 has the result that the right foot 12 already touches the ground 5 by means of its tip, while a distance A still exists between the tip of the left foot 13 and the ground 5. If the force upon the foot lever 16 is now increased, the two-wheeler will tilt out of the plane situated perpendicular to the ground 5 toward the two-wheeler operator as depicted by plane P" shown in FIG. 6. The operator is not shown and would be standing on the left side of the two-wheeler so as to engage foot lever 16. This occurs until also the tip of the left foot 13 touches the ground 5. Only then will the tilting stand 11 rotate about the additional swiveling axis the connection line 15 of the two ground contact points 14 which is illustrated by a broken line—clockwise while lifting the two-wheeler frame; specifically until the free end 14 at the side of the foot lever 16 also touches the ground 5 or until a stop face on the two-wheeler not shown here comes to rest on the tilting stand 11. During this second part of the rightening-up procedure, the two-wheeler will again continuously swivel back into the plane P which is situated perpendicular on the ground 5, because, corresponding to the prior art, both supports 17, 18 have the same length.

A tilt of the two-wheeler directed toward the operator has a favorable effect on the resistance to tipping-over when the two-wheeler is placed on the tilting stand 11 as well as for the removal from the tilting stand 11 for readying the two-wheeler for driving because, in the event of unevenness, the operator can simply use his body weight for reestablishing a stable state of equilibrium in that he leans against the inclined two-wheeler.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Bipod support for a two wheeled vehicle mounted on the vehicle for swiveling movement about a first axis extending in a transverse direction of the vehicle, and for its operation by a foot lever can be swiveled from a first end position for the driving support operation into a second end position for a vehicle support position, the bi-pod support including a first foot and a second foot, wherein during swiveling for placing the vehicle in an intermediate position, the bipod support touches the ground with both of its feet and, starting from this intermediate position, the two-wheeler and the first axis of the bipod support being swiveled about another swiveling axis extending along a connection line of respective two ground contact points of the feet, until the bipod support has reached its second end position, and wherein one of the two feet of the bipod support, viewed in the longitudinal direction of the two-wheeler, projects farther toward the front than the other.

2. Bipod support according to claim 1, wherein the right foot projects farther toward the front.

3. A bipod support assembly for a two wheel vehicle comprising:
- a bipod support frame mountable at a vehicle frame for pivotal movement about a first pivot axis extending transversely of a vehicle frame center plane,
- a first and second support legs fixed to the support frame and extending away from said first pivot axis at respective opposite sides of the center plane,
- a first foot member fixed to an end of the first leg and a second foot member fixed to an end of the second leg,
- wherein said support assembly is pivotably movable about the first pivot axis from a stowed position to an intermediate position where said foot members engage a ground surface at respective ground contact points at opposite sides of the vehicle frame center plane and about a second pivot axis through the ground contact points to a vehicle parked position with lifting and supporting of the motorcycle frame, and
- wherein said first foot member is larger than the second foot member in a vehicle longitudinal direction such that, during said movement to the intermediate position, said first foot member engages said ground surface and causes an intentional tilting of the vehicle frame toward one side of the vehicle from center plane to aid a vehicle operator in controlling the vehicle during parking operations.

4. An assembly according to claim 3, comprising a foot lever fixed to one of said support legs and engageable by a vehicle operator to move the support assembly between the stowed position and the parked position.

5. An assembly according to claim 4, wherein said foot lever is fixed to said second leg such that vehicle frame is tilted toward the operator during parking operations.

6. An assembly according to claim 3, wherein the two wheel vehicle is a motorcycle.

7. A motorcycle comprising:
- a vehicle frame having a frame center plane
- a pair wheels spaced longitudinal from one another along the center plane, and
- a bipod support assembly for supporting the motorcycle in a parked position, said bipod support assembly comprises:
  - a bipod support frame mountable at a vehicle frame for pivotal movement about a first pivot axis extending transversely of a vehicle frame center plane,
  - a first and second support legs fixed to the support frame and extending away from said first pivot axis at respective opposite sides of the center plane,
  - a first foot member fixed to an end of the first leg and a second foot member fixed to an end of the second leg,
  - wherein said support assembly is pivotably movable about the first pivot axis from a stowed position to an intermediate position where said foot members engage a ground surface at respective ground contact points at opposite sides of the vehicle frame center plane and about a second pivot axis through the ground contact points to a vehicle parked position with lifting and supporting of the motorcycle frame, and
  - wherein said first foot member is larger than the second foot member in a vehicle longitudinal direction such that, during said movement to the intermediate position, said first foot member engages said ground surface and causes an intentional tilting of the vehicle frame toward one side of the vehicle from center plane to aid a vehicle operator in controlling the vehicle during parking operations.

8. A motorcycle according to claim 7, comprising a foot lever fixed to one of said support legs and engageable by a vehicle operator to move the support assembly between the stowed position and the parked position.

9. A motorcycle according to claim 8, wherein said foot lever is fixed to said second leg such that vehicle frame is tilted toward the operator during parking operations.

10. An assembly according to claim 7, wherein said foot lever is fixed to said second leg such that vehicle frame is tilted toward the operator during parking operations.

* * * * *